(12) United States Patent
Jin et al.

(10) Patent No.: US 11,899,534 B2
(45) Date of Patent: Feb. 13, 2024

(54) TECHNIQUES FOR PROVIDING DIRECT HOST-BASED ACCESS TO BACKUP DATA USING A PROXY FILE SYSTEM

(71) Applicant: Dell Products L.P., Hopkinton, MA (US)

(72) Inventors: Qi Jin, Sudbury, MA (US); Nagasimha G. Haravu, Apex, NC (US); Ashish Sharma, Delhi (IN); William Whitney, Marlborough, MA (US)

(73) Assignee: Dell Products L.P., Hopkinton, MA (US)

( * ) Notice: Subject to any disclaimer, the term of this patent is extended or adjusted under 35 U.S.C. 154(b) by 85 days.

(21) Appl. No.: 17/576,048

(22) Filed: Jan. 14, 2022

(65) Prior Publication Data
US 2023/0229559 A1 Jul. 20, 2023

(51) Int. Cl.
*G06F 11/14* (2006.01)

(52) U.S. Cl.
CPC ...... *G06F 11/1435* (2013.01); *G06F 11/1451* (2013.01); *G06F 11/1464* (2013.01); *G06F 11/1469* (2013.01); *G06F 2201/80* (2013.01)

(58) Field of Classification Search
CPC .. G06F 11/14; G06F 11/1435; G06F 11/1451; G06F 11/1464; G06F 11/1469; G06F 2201/80
See application file for complete search history.

(56) References Cited

U.S. PATENT DOCUMENTS

| | | | | |
|---|---|---|---|---|
| 7,584,339 B1 * | 9/2009 | Bingham | ............ | G06F 11/1466 711/161 |
| 8,346,753 B2 * | 1/2013 | Hayes | ................... | G06F 16/951 707/711 |
| 8,732,135 B1 * | 5/2014 | Gardner | ............... | G06F 11/1469 707/679 |
| 2005/0216788 A1 * | 9/2005 | Mani-Meitav | ...... | G06F 11/1464 714/E11.122 |
| 2013/0346709 A1 * | 12/2013 | Wang | ................... | G06F 11/1469 711/E12.103 |
| 2015/0378642 A1 * | 12/2015 | Moon | ................... | G06F 3/0619 711/162 |
| 2016/0371153 A1 * | 12/2016 | Dornemann | ........ | G06F 11/1458 |
| 2019/0158469 A1 * | 5/2019 | Gonzalez | ............. | H04B 17/318 |
| 2020/0401487 A1 * | 12/2020 | Ghodake | ............. | G06F 11/1469 |
| 2021/0357246 A1 * | 11/2021 | Kumar | ................ | G06F 11/1464 |
| 2023/0019626 A1 * | 1/2023 | Whitney | ............. | G06F 11/1464 |

OTHER PUBLICATIONS

U.S. Appl. No. 17/379,319, filed Jul. 19, 2021, entitled System and Method for Providing Direct Host-Based Access to Backup Data, to William C. Whitney, et al.

\* cited by examiner

*Primary Examiner* — Kamini B Patel
(74) *Attorney, Agent, or Firm* — Muirhead and Saturnelli, LLC

(57) ABSTRACT

Techniques for providing direct access to backup data can include: receiving a selection of a backup of a file system, wherein the backup is stored on a backup system connected to a data storage system; creating, in accordance with said selection of the backup, a remote copy of the backup, wherein the remote copy is stored on the backup system; generating a proxy file system for the remote copy on the backup system, wherein the proxy file system is mapped by the data storage system to the remote copy on the backup system; and providing a host with direct access to the remote copy using the proxy file system.

19 Claims, 9 Drawing Sheets

TECHNIQUES FOR PROVIDING DIRECT HOST-BASED ACCESS TO BACKUP DATA USING A PROXY FILE SYSTEM

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system with one or more processors and a memory that includes code that performs a method, and a non-transitory computer readable medium comprising code stored thereon that when executed performs the method. The method and the computer-implemented method can include: receiving a selection of a backup of a file system, wherein the backup is stored on a backup system connected to a data storage system; creating, in accordance with said selection of the backup, a remote copy of the backup, wherein the remote copy is stored on the backup system; generating a proxy file system for the remote copy on the backup system, wherein the proxy file system is mapped by the data storage system to the remote copy on the backup system; and providing a host with direct access to the remote copy using the proxy file system. The selection can include one or more files in the backup of the file system, and wherein the remote copy can include a corresponding version of each of the one or more files as included in the backup of the file system. The selection can identify the file system and wherein the remote copy can be a complete copy of the file system at a point in time associated with the backup.

In at least one embodiment, the backup can be a snapshot of the file system at a point in time. Processing can include: exposing the proxy file system to the host; issuing, by the host, one or more I/O operations directed to the proxy file system; and processing the one or more I/O operations on the remote copy within the backup system. Processing can further include: receiving the one or more I/O operations at the data storage system; and redirecting the one or more I/O operations, which are directed to the proxy file system of the data storage system, to the remote copy on the backup system.

In at least one embodiment, the one or more I/O operations can include at least a first write I/O operation, and redirecting can include: sending the one or more I/O operations from the data storage system to the backup system; and applying, by the backup system, the one or more I/O operations to the remote copy on the backup system. The file system of the data storage system can be exposed to the host at the same time the proxy file system is exposed to the host. Processing can include: issuing a second set of one or more I/O operations directed to the file system; and applying, by the data storage system, the second set of one or more I/O operations to the file system of the data storage system. Processing can include: receiving a request to discontinue access to the remote copy; and responsive to the request, performing processing including deleting the remote copy on the backup system.

In at least one embodiment, the remote copy can be identified in the backup system using a backup identifier (ID), and processing can include: creating a control path object that is a local representation of the remote copy within the data storage system; mapping the control path object to the remote copy using the backup ID; creating a proxy file system object representing the proxy file system in the data storage system; and mapping the proxy file system object to the control path object. Providing a host with direct access to the remote copy using the proxy file system can include: using the proxy file system object and the control path object to retrieve the backup ID of the remote copy; and accessing the remote copy on the backup system using the backup ID of the remote copy on the backup system. Accessing the remote copy can include providing the backup ID to the backup system to identify the remote copy on the backup system to be accessed.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
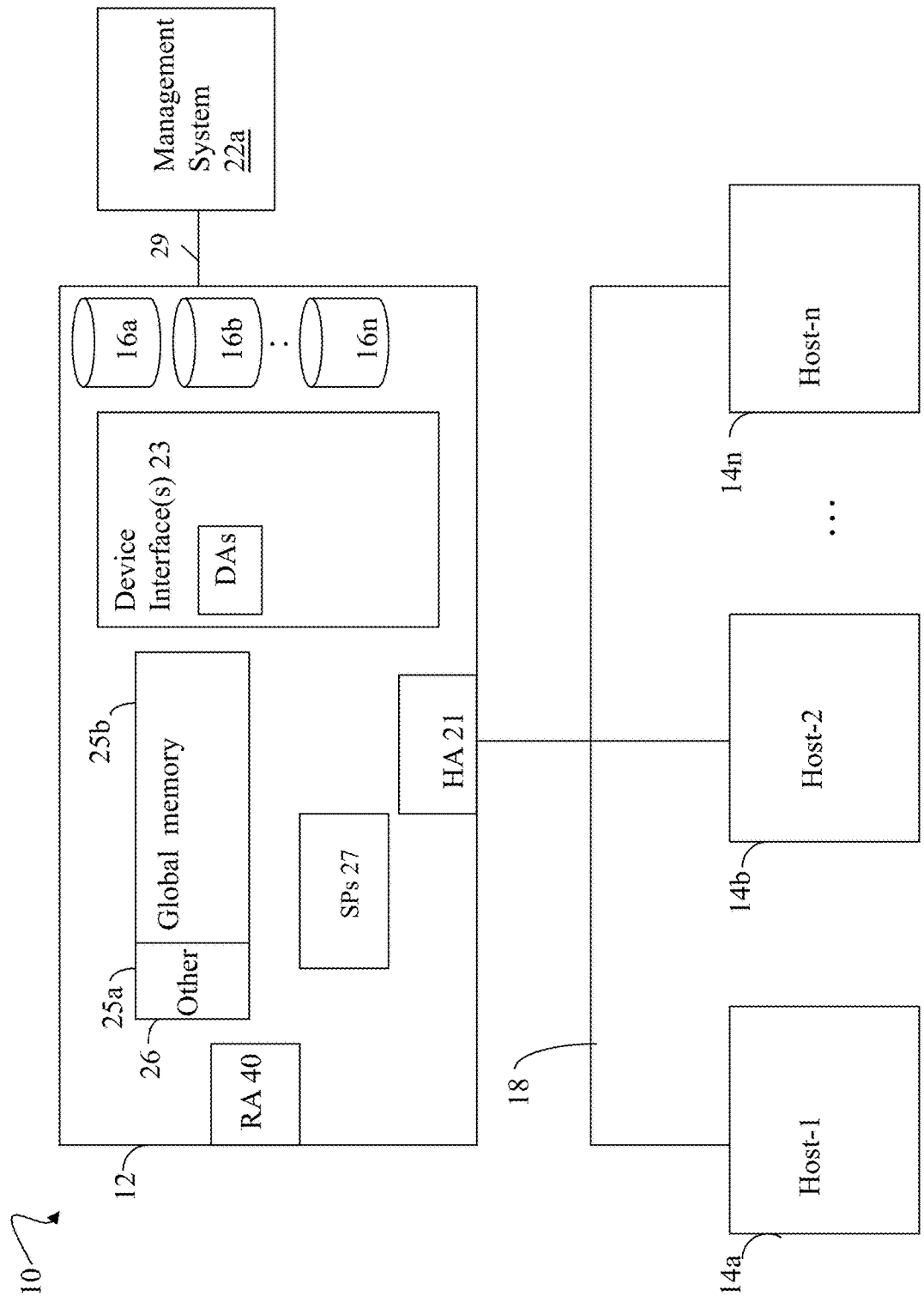
FIGS. 1, 3, 4, 5, 8 and 9 are examples of components that can be included in a system in accordance with the techniques of the present disclosure.

A data storage system can provide different data services including, for example, block services in connection with accessing block devices or volumes, and file-based services in connection with file systems. In one aspect, a unified storage system can be characterized as a data storage system that provides both block services and file-based services. File systems can be backed up from the data storage system to a backup (BU) system or appliance. Additionally, as needed, backed up versions of the file systems can also be restored from the BU system or appliance to the data storage system.

In conventional data storage systems, it can be required to restore a BU of an entire file system to the data storage system prior to being able to access the file system for any purpose. Given the storage administrator may only want to retrieve a few files, a better solution can include providing access to the file system backups directly on the backup appliances.

Accordingly, described in the following paragraphs are techniques that can be used to access the file system backups directly on the BU system or appliance. In at least one embodiment, the data storage system in accordance with the techniques of the present disclosure can be characterized as a unified storage system providing both file system services and block volume services. In at least one embodiment, the unified data storage system can include a server or service that supports direct file and/or file system access to backed up file systems on the BU system or appliance. In at least one embodiment, the server or service providing the direct file or file system access to a backup of the file system on the BU system or appliance can be a file service or server such as a NAS file service or server of the data storage system.

In at least one embodiment, a proxy file system (FS) of the data storage system can be mapped to a remote BU on the BU system or appliance, where the proxy FS can be used by a host or other client to directly access the remote BU through the data storage system. In at least one embodiment, the proxy FS can be mounted on a block device or volume exposed as a logical device. The logical device, and thus the block device or volume, can be mapped to the remote BU on the BU system. The proxy FS can be exposed or exported outside the data storage system for use by one or more data storage system clients such as, for example, one or more hosts. The host can issue file-based I/O operations as well as other file-based commands and operations directed generally at the file system, or a storage entity, such as a file, folder or directory of the file system. The data storage system can redirect commands and operations generally directed to the proxy FS, or a storage entity of the proxy FS, to the remote BU which is mapped to the proxy FS. In this manner, the proxy FS can be used by the host to directly access the remote BU on the BU appliance through the data storage system. The various commands and operations issued by the host and directed to the proxy FS can be directly applied to, or serviced using, the remote BU on the BU appliance without requiring that the remote BU be restored on the data storage system.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14*a*-14*n* through the communication medium 18. In this embodiment of the system 10, the n hosts 14*a*-14*n* can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14*a*-14*n* can access and communicate with the data storage system 12, and can also communicate with other components included in the system 10.

Each of the host systems 14*a*-14*n* and the data storage system 12 included in the system 10 are connected to the communication medium 18 by any one of a variety of connections in accordance with the type of communication medium 18. The processors included in the host systems 14*a*-14*n* and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14*a*-14*n* and the data storage system 12 can all be located at the same physical site, or, alternatively, can also be located in different physical locations. The communication medium 18 used for communication between the host systems 14*a*-14*n* and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14*a*-14*n* and the data storage system 12 are connected to the communication medium 18 can pass through other communication devices, such as switching equipment, a phone line, a repeater, a multiplexer or even a satellite.

Each of the host systems 14*a*-14*n* can perform data operations. In the embodiment of the FIG. 1, any one of the host computers 14*a*-14*n* can issue a data request to the data storage system 12 to perform a data operation. For example, an application executing on one of the host computers 14*a*-14*n* can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16*a*-16*n*. The data storage devices 16*a*-16*n* can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
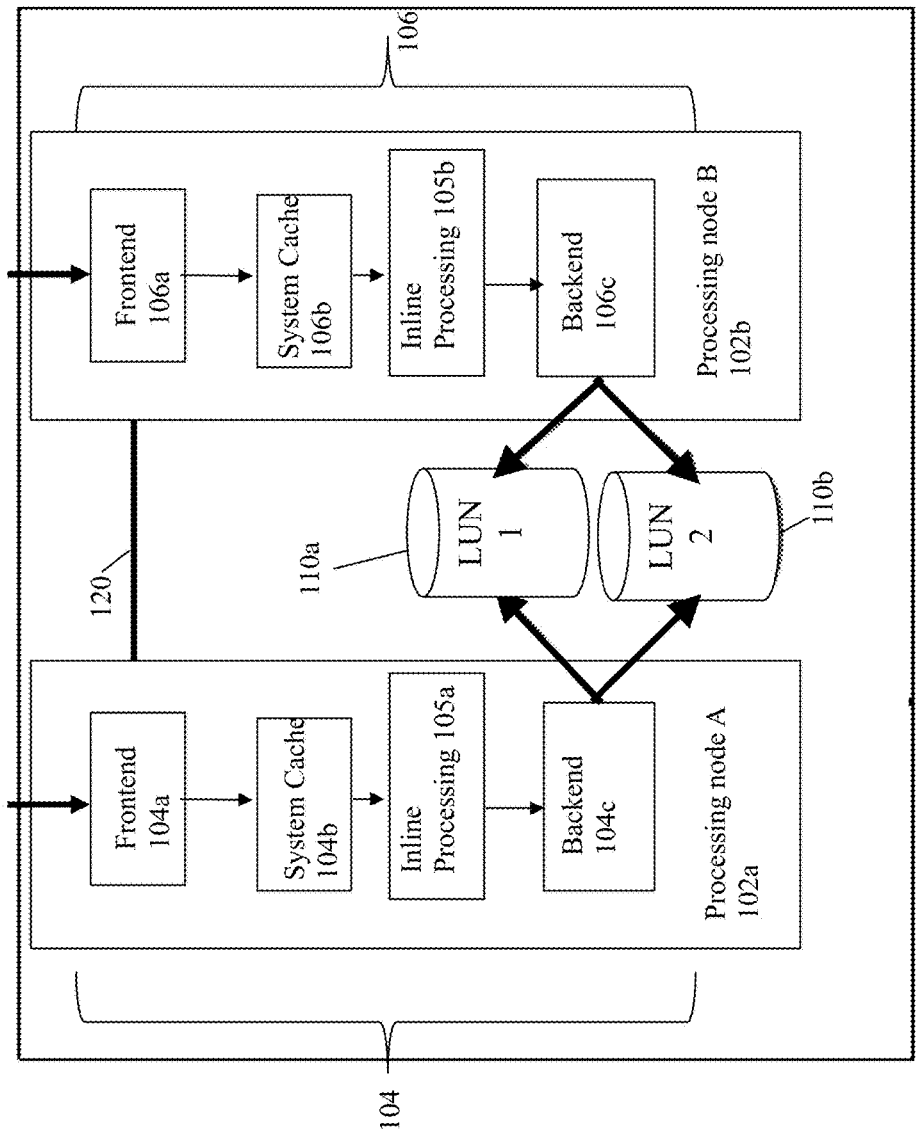
FIG. 2 is an example illustrating the PO path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

As noted above, data storage system can provide different data services including, for example, block services in connection with accessing block devices or volumes, and file-based services in connection with file systems. In one aspect, a unified storage system can be characterized as a data storage system that provides both block services and file-based services. File systems can be backed up from the data storage system to a backup (BU) system or appliance. Additionally, as needed, backed up versions of the file systems can also be restored from the BU system or appliance to the data storage system.

In conventional data storage systems, it can be required to restore a BU of an entire file system to the data storage system prior to being able to access the file system for any purpose. Given the storage administrator may only want to retrieve a few files, a better solution can include providing access to the file system backups directly on the backup appliances.

Accordingly, described in the following paragraphs are techniques that can be used to access the file system backups directly on the BU system or appliance. In at least one embodiment, the data storage system in accordance with the techniques of the present disclosure can be characterized as a unified storage system providing both file system services and block volume services. In at least one embodiment, the unified data storage system can include a server or service that supports direct file and/or file system access to backed up file systems on the BU system or appliance. In at least one embodiment, the server or service providing the direct file or file system access to a backup of the file system on the BU system or appliance can be a file service or server such as a NAS file service or server of the data storage system.

In at least one embodiment, a proxy FS of the data storage system can be mapped to a remote BU on the BU system or appliance, where the proxy FS can be used by a host or other client to directly access the remote BU through the data storage system. In at least one embodiment, the proxy FS can be mounted on a block device or volume exposed as a logical device. The logical device, and thus the block device or volume, can be mapped to the remote BU on the BU system. The proxy FS can be exposed or exported outside the data storage system for use by one or more data storage system clients such as, for example, one or more hosts. The host can issue file-based I/O operations as well as other file-based commands and operations directed generally at the file system, or a storage entity, such as a file, folder or directory of the file system. The data storage system can redirect commands and operations generally directed to the proxy FS, or a storage entity of the proxy FS, to the remote BU which is mapped to the proxy FS. In this manner, the proxy FS can be used by the host to directly access the remote BU on the BU appliance through the data storage system. The various commands and operations issued by the host and directed to the proxy FS can be directly applied to, or serviced using, the remote BU on the BU system or appliance without requiring that the remote BU be restored on the data storage system.

In at least one embodiment of the techniques of the present disclosure, processing can include: backing up a FS to the BU system or appliance; creating a local representation of the FS BU on the data storage system; and selecting the local representation to request remote direct access (RDA) to the BU on the BU system or appliance. In at least one embodiment, processing can also include signaling the file system service on the data storage to request that a proxy FS be created. In at least one embodiment, a remote copy can be made of the FS BU, or selected portions thereof, rather than operate on the original FS BU in order to preserve the FS BU. The remote copy can be stored on the BU system or appliance. The proxy FS can be mapped to the remote copy, where the proxy FS can be used to access the remote copy on the BU system. The file system service can request that the block service on the data storage system create a LUN or front-end volume as a proxy and enable the LUN for RDA. When the block volume is created as a proxy to the remote copy on the remote BU system, the file system service can then mount the block volume as the proxy FS. Shares in the proxy FS can be created after the proxy FS mounted. In this manner, the shares can be used to provide clients or users with desired access to the remote copy through the proxy FS that is mapped to the remote copy of the BU system.

The foregoing and other aspects of the techniques of the present disclosure are described in more detail in the following paragraphs.

Figure 3:
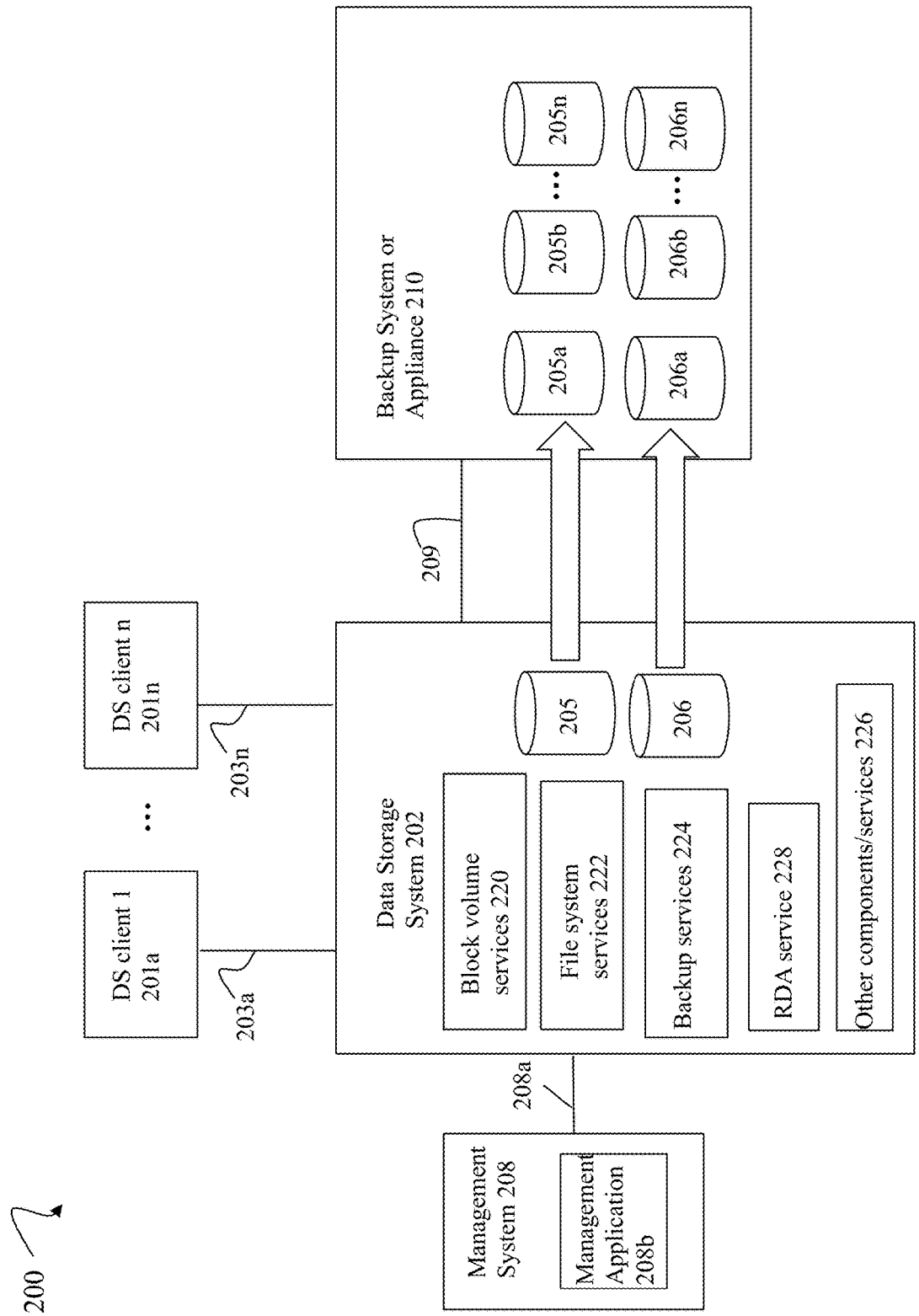

Referring to FIG. 3, shown is an example 200 of components and systems that can be included in an embodiment in accordance with the techniques of the present disclosure.

The example 200 includes the data storage system 202 communicatively coupled to n data storage system (DS) clients 201a-n, respectively, over the connections 203a-n. The example 200 also includes the backup (BU) system or appliance 210 communicatively coupled to the data storage system 202 over the connection 209. The data storage system 202 can include and provide block volume services 220 and file system services 222 to the DS clients 201a-n. The DS clients 202a-n can include, for example, hosts or other applications of hosts that have their data stored on the system 202. The elements 205 and 206 can generally represent data storage objects stored locally on the system 202. For example, the elements 205, 206 can each represent a block-based storage object such as a LUN or logical device in accordance with the SCSI protocol, or can represent a file system in accordance with any suitable filed-based protocol.

The block volume services 220 can include and provide services to the clients 201a-n in connection with block-based storage objects such as, for example, LUNs or logical devices in accordance with, for example, the SCSI protocol. The file system services 222 can include and provide services in connection with file-based storage objects, such as, for example, files, directories, file systems, and the like, in accordance with one or more of file system protocols such as NFS (network file system), CIFS (common interface file system), and the like. In at least one embodiment, the file system services 222 can include one or more Network Attached Storage (NAS) servers. Each of the NAS servers can be a file server providing file system services in connection with one or more file-based protocols such as, for example, NFS and/or CIFS. The clients 201a-n can issue commands or requests, respectively, over the connections 203a-n to the data storage system 202, where such commands or requests can be in accordance with any supported file-based or block-based protocols. For example, the client 201a can issue a block-based I/O command to the block volume services 220 to perform an I/O operation in connection with data stored on a LUN represented by the element 205. As another example, the client 201n can issue a file-based I/O command to the file system services 222 to perform an I/O operation in connection with data stored in a file of a file system represented by the element 206.

Consistent with other discussion herein, the data storage system 202 can provide additional data storage services besides the block volume services 220 and the file system services 222. For example, in at least one embodiment in accordance with the techniques of the present disclosure, the data storage system 202 can provide backup services 224 for use in connection with its storage objects 205, 206. The data storage system 202 can include an RDA (remote data access) service 228 which is described in more detail in the following paragraphs in connection with providing remote data access to a remote BU on the BU system 210 using a proxy FS. The data storage system 202 can also generally include other components and services 226 also described in more detail in the following paragraphs in connection with performing the techniques of the present disclosure. The element 226 can include, for example, additional components and services of the data path and control path.

The backup services 224 can include, for example, software running on the data storage system that can define a backup schedule for backing up a storage object, software (e.g., one or more communication modules) that communicates with the BU system or appliance 210 to backup requested storage objects of the data storage system 202 to the BU system 210, and/or performs other processing. For example as described in connection with the management system 22a of FIG. 1, the management system 208 can run a data storage system management application (sometimes referred to as management application) 208b with a graphical user interface (GUI) that a data storage system manager or administrator can use in connection with management of the data storage system 202. The management application 208b of the management system 208 can be used to issue control or management commands over the control or management path over the connection 208a to the data storage system 202. The management application 208b on the management system 208 can be used to configure a backup schedule for, and/or manually backup on demand, one or more storage objects 205, 206 of the data storage system. For example, the management application 208b can communicate with the backup services 224 and can configure the backup schedule for the one or more storage objects 205, 206, where such objects 205, 206 are backed up to the BU system or appliance 210 The backup services 224 can communicate with other software executing on the BU system or appliance 210 to create and store the BU objects or instances 205a-n, 206a-n. For example using the management application 208b, a user can specify one or more conditions indicating different points in time as to when to backup a storage object 205, 206 from the data storage system 202 to the BU system or appliance 210. The one or more conditions can specify, for example, a time interval (e.g., once, every hour, every day, weekly) as to when to create a new backup instance of the storage object at a point in time; and/or can specify one or more change-based criteria (e.g., after a specified amount of data has been changed or modified) as to when to create a new backup instance of the storage object at a point in time; and/or can specify a time-based threshold as to when to create a new backup instance of the storage object at a point in time.

In the example 200, the elements 205a-n can each denote a BU storage object or instance created for the storage object 205, respectively, at "n" different points in time; and the elements 206a-n can each denote a BU storage object or instance created for the storage object 206, respectively, at "n" different points in time. Each backup storage object or instance 205a-n 206a-n created on the BU system or appliance 210 can be any suitable BU object or instance. For example, in at least one embodiment, the BU object or instances 205a-n can include one or more of: a complete physical copy or replica (e.g., bit for bit physical copy) of the source storage object 205 at a particular point in time and/or a snapshot of the source storage object 205 at a particular point in time. Each of the BU storage objects 205a-n, 206a-n can be characterized as a point in time copy, respectively, of a storage object 205, 206 of the data storage system 202.

In at least one embodiment, at least some of the BU storage objects 205a-n, 206a-n can be complete physical copies (e.g., bit for bit) or replicas, respectively, of the source storage objects 205, 206 at different points in time. In at least one embodiment, at least some of the BU storage objects 205a-n, 206a-n can be snapshots, respectively, of the source storage objects 205, 206 at different points in time. As known in the art, a snapshot can be characterized as a logical or virtual point in time copy of a data source taken using a snapshot technology or facility, where each snapshot is not a complete physical copy of the data source and rather generally only denote differences or changes with respect to the data source. Generally, the data source can be a logical device or LUN, a file system, or any suitable storage object or entity. Snapshots can rely, for example, on copy on first write (COFW) and other techniques to track changes made with respect to a data source. The data source can be a complete physical copy or replica at a first point in time. A snapshot can be taken at a subsequent point in time where the snapshot can reflect the changes made to the data source subsequent to the first point in time and up to the subsequent point in time when the snapshot is created. Any writes to the data source can result in processing by snapshot software, for example, copying the original data prior to changes into another area of storage before overwriting a data source location with the newly written data (e.g., original data is copied/written to a new location). With respect to COFW techniques, the COFW occurs only once for each data block modified on the data source. Since only changed data blocks of the data source are retained rather than make a complete copy of the data source, the storage capacity required to implement snapshots can be considerably less than that of the data source. Though a snapshot of a data source can be presented to a user as a separate storage object along with the current data source, a snapshot of the data source is a virtual point in time copy and requires access to the unchanged original data source from the first point in time. Therefore failures affecting the data source can also affect subsequently taken snapshots of the data source. Snapshots of a data source can be contrasted, for example, with the physically complete bit-for-bit replicas of the data source.

In connection with the foregoing, COFW is only one example of a technology or a technique that may be used in connection with snapshots. More generally, any suitable technique may be used in connection with snapshot creation and the techniques described herein. As another example, redirect on Write (ROW) is another technique that may be used in connection with a snapshot implementation. With ROW, after a snapshot is taken, new writes to the primary or logical device are redirected (written) to a new location. With ROW in at least one embodiment, when a data source is written to and the original data of the source needs to be preserved for a snapshot(s), the new write is accepted and asynchronously written to a new location. The source now points to the new data while the snapshot(s) continue to point to the original data (e.g., the snapshot delta) in its original location. For example, the backup services 224 can communicate with the BU system or appliance 210 to create a complete physical copy of the storage object 205 daily at 8 a.m., and then hourly, from 9 a.m. to 5 p.m., create snapshots with respect to the 8 a.m. copy of the object 205.

In at least one embodiment in accordance with the techniques of the present disclosure, the storage objects 205, 206 can be file systems, and the backed up storage objects 205a-n, 206a-n can be backed up instances of the file systems. In at least one embodiment, each of 205a-n, 206a-n can be a snapshot of a file system.

File systems can be backed up to, and restored from, the BU system or appliance 210 for any reason. A client of the data storage system 202 can have different needs and requirements for accessing the file system backups, such as snapshots 205a-n, on the BU system or appliance 210 when the corresponding primary file system, such as 205, and/or snapshots 205a-n may not be available locally on the data storage system 202. For example, the client can be a user or application on a host that may want to do one or more of the following:

1) Access individual files from a backup prior restoring the complete file system from the backup.
2) Query or search a large number of archived files on the BU system or appliance 210.
3) Copy or move individual files and/or directories from the BU system or appliance 210 to the production environment on the data storage system 202 for immediate recovery.

Currently with conventional systems as noted above, it is typically required to restore the complete file system from a backup version of the BU system or appliance 210 to the data storage system 202 prior to being able to access files, directories, and the like, from the restored backup version that can be stored locally on the data storage system 202. With a large number of archived files in a backup of a file system, performing the complete restoration of a backup version of the file system can be very time consuming. In some use case scenarios, a user, such as a storage administrator, may only want to retrieve a few files yet the user can be required to wait until the complete and often large file system backup has been restored from the BU system or appliance 210 to the data storage system 202.

Accordingly, described in the following paragraphs are techniques that can be used to access the file system backups directly from the BU system or appliance 210. In at least one embodiment, the data storage system 202 in accordance with the techniques of the present disclosure can be characterized as a unified storage system providing both file system services 222 and block volume services 220. In at least one embodiment, the unified data storage system can include a server or service that supports direct file and/or file system access to backed up file systems on the BU system or appliance 210. In at least one embodiment, the server or service providing the direct file or file system access to a backup of the file system on the BU system or appliance 210 can be a file service or server such as a NAS file service or server. In at least one embodiment, the NAS file service or server can be SDNAS denoting a software defined version of the NAS file server or service. In such an embodiment using SDNAS, the NAS file servers can execute in the context of the VMs on the data storage system 202. The SDNAS file server or service hosted on the data storage system 202 can consume physical storage from the backend non-volatile storage devices exposed as data stores or file systems through the SDNAS file servers to the clients 201a-n which can be, for example, hosts.

Figure 4:
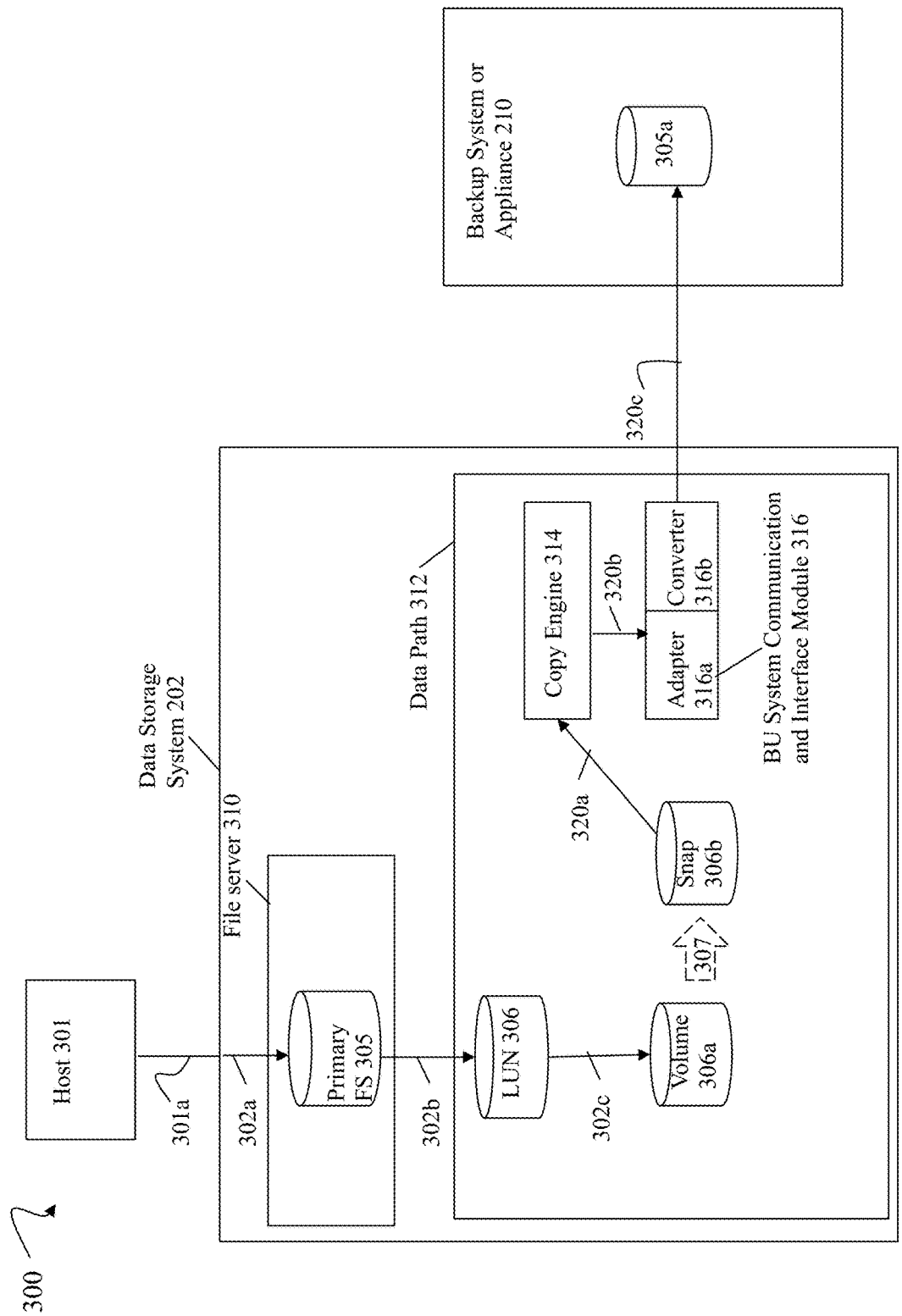

Referring to FIG. 4, shown is an example 300 illustrating in more detail components and associated processing flow to create a backup of a file system in at least one embodiment in accordance with the techniques herein.

The example 300 includes the data storage system 202 and BU system or appliance 210 as generally described above in connection with FIG. 3. The host 301 is one particular instance of a DS client of the data storage system 202, where the host 301 and the data storage system 202 communicate over connection 301a. The data storage system 202 can include the file server 310 and the data path 312. The file server 310 can be, for example, a NAS file server, an SDNAS file server, or more generally any suitable file server. The file server 310 can expose to the host 301 the primary file system (FS) 305 which is mounted on a block device, the LUN 306, exposed by the data path 312. Within the data path 312, the LUN 306 can be mapped to an internal volume 306a configured from BE non-volatile storage (e.g., from BE PDs) of the data storage system 202. In at least one embodiment, the volume 306a can denote a local storage object of the system 202 that is not directly exposed outside of the data path 312. The volume 306a can be mapped to the LUN 306, where the LUN 306 denotes a block device exposed by the data path 312 to external clients and services, such as the file server 310. The arrows 302a-c denote the logical flow of I/O commands from the host 301, for example, when the host 301 issues file-based I/O commands (e.g., read and write commands) to the primary FS 305.

As noted above, a BU of a storage object, such as the primary FS 305, can be made. The volume 306a can denote underlying physical storage that is provisioned for and mapped to the primary FS 305. Accordingly, creating a BU of the primary FS 305 can include backing up an instance of the volume 306a at a point in time. In at least one embodiment, the BU 305a can denote a BU of a snapshot of the primary FS 305 created at a point in time T1. Creating the BU 305a can include first creating (307) the snapshot, snap 306b, of the underlying volume 306a at the time T1. In at least one embodiment, the copy engine 314 can control the copying of data of the snap 306b to the BU system or appliance 210 to create the BU instance 305a. Subsequent to creating the snap 306b, the data of the snap 306b can be transmitted (320a) to the copy engine 314, sent (320b) from the copy engine 314 to the BU system communication and interface module 316, and then sent (320c) from the BU system communication and interface module 316 to the BU system or appliance 210. The data of the snap 306b denoting the snapshot of the primary FS 305 at the time T1 can be stored as the BU storage object 305a in any suitable format in accordance with the particular BU system or appliance 210.

In at least one embodiment, the BU system communication and interface module 316 can include an adapter 316a which facilitates communications between the copy engine 314 and the converter 316b. The converter 316b can be customized and particular for use with a particular BU system or appliance 210. The converter 316b can facilitate communications between the BU system or appliance 210 and the adapter 316a. For example, the converter 316b can communicate with the BU system or appliance 210 using a data format and protocol that is used and understood by the BU system or appliance 210. For example, the converter 316b can perform any necessary data conversion to place the data of the snap 306b in a format and/or representation that is used and understood by the BU system or appliance 210.

In at least one embodiment, multiple different BU systems or appliances using software and/or hardware from multiple vendors can be supported and can communicate with the data storage system 202. In such an embodiment, a different instance of the converter 316b can be used to communicate with each of the different supported BU systems or appliances including different software and/or hardware for the particular BU system or appliance. In at least one embodiment, the data storage system 202 can be one of multiple different types or models of data storage systems, where each such different type or model can vary in terms of software and/or hardware. In such an embodiment, a different instance of the adapter 316a can be used for each of the different supported types or models of data storage systems in order to communicate with the particular instance of the copy engine 314 or other data storage system component in implementing the techniques of the present disclosure.

Figure 5:
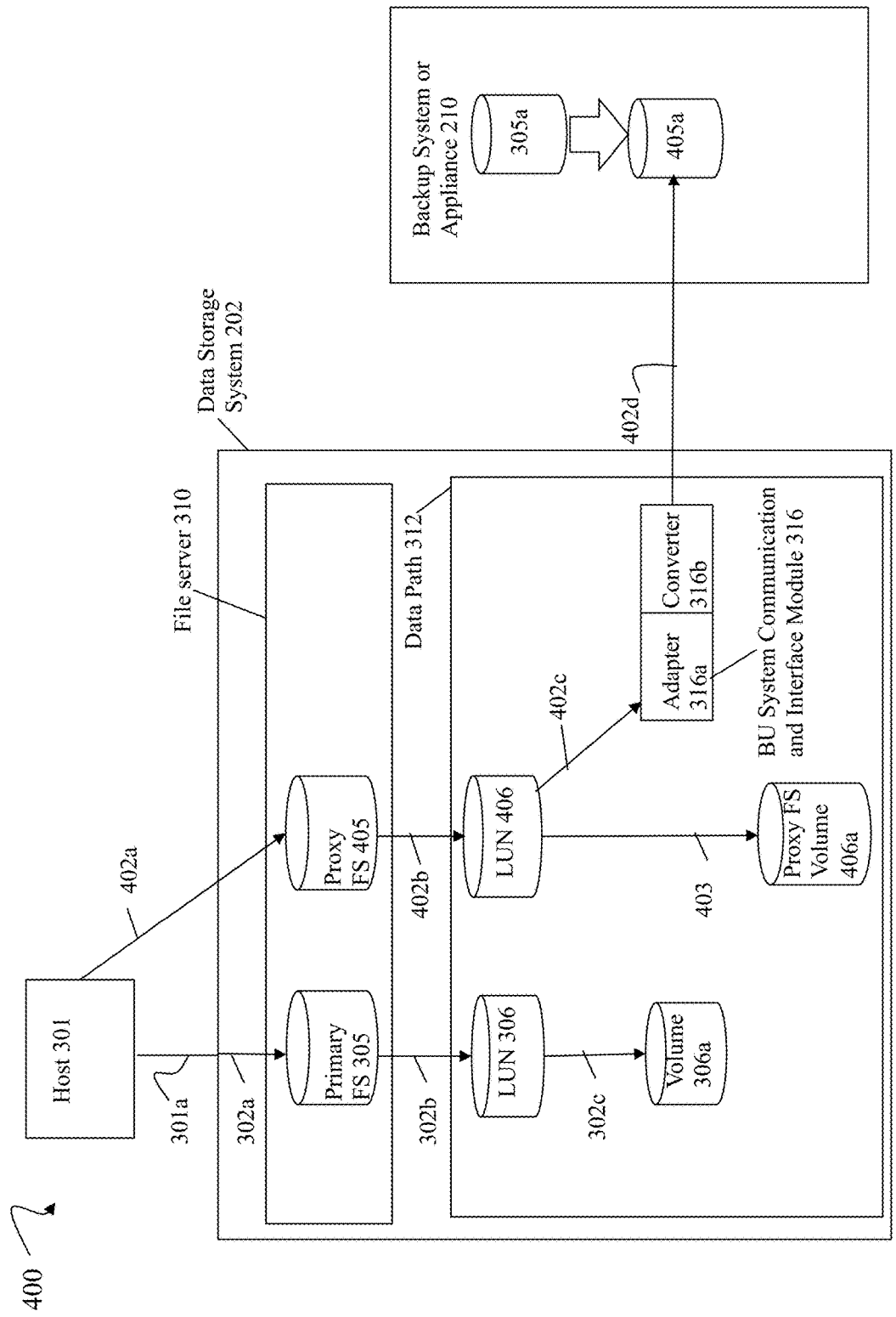

Referring to FIG. 5, shown is an example 400 illustrating components and associated processing flow in at least one embodiment in accordance with the techniques herein.

The example 400 of FIG. 5 includes similarly numbered components as described above in connection with FIG. 4. The example 400 generally illustrates processing performed to create a remote copy 405a denoting a copy of the selected BU data 305a on the BU system or appliance 210. The example 400 also generally illustrates the state of the data storage system 202 in at least one embodiment in which the remote copy 405a can be directly access by the host 301 through the proxy FS 405 of the data storage system 202.

First is an initial discussion regarding creating the remote copy 405a of the BU system or appliance 210. Subsequently, the components of the data storage system 202 are discussed in more detail in connection with using the proxy FS 405 to access the remote copy 405a, In at least one embodiment, a user of the data storage system 202 can make a selection of particular backup data stored on the BU system 210 or appliance, where the selection denotes the particular backup data portion that the user wants to access. For example, the user can select the particular BU snapshot 305a of the primary FS 305 where the user wants to remotely access on the BU system 210 the BU snapshot 305a of the primary FS 305 taken at the time T1. The primary FS 305 of FIG. 5 may denote the state at a time T2 subsequent to T1 where, at the time T2, subsequent I/O operations and/or other file-based operations (e.g., new files created, existing files deleted, new file system directories created, and/or existing file system directories deleted) may have been performed to the primary FS 305 since the time T1 when the BU 305a was made.

In at least one embodiment, the remote copy 405a of the selected BU data 305a can be created and stored on the BU system or appliance 210 for use with the techniques of the present disclosure. In at least one embodiment as described in more detail in the following paragraphs, the host 301 can use a proxy FS created using the techniques of the present disclosure to directly access the remote copy 405a of the selected backup data through the data storage system 202. For example, the host 301 can issue I/Os (e.g., writes) to one or more files and/or other file-based commands (e.g., create a new file and/or delete an existing file) directed to the proxy FS, or file or other storage entity thereof, which can be directly applied to the remote copy 405a. Thus the element 405a generally denotes a replica or copy of the selected BU data 305a, where the replica or copy 405a is a remote copy stored on the BU system or application 210 for use with the techniques of the present disclosure. In this manner, the original BU data 305a can be preserved.

For purposes of illustration, the remote copy 405a may be described as a copy of the BU snapshot 305a of the primary FS 305 at the time T1. More generally, the selected backup data can be any suitable storage entity of the primary FS 305 captured in the snapshot 305a. For example, rather than select an entire FS from the BU snapshot 305a that is copied to 405a, a user can select a portion of the FS snapshot 305a such as, for example, one or more files of the primary FS snapshot 305a, one or more directories of the primary FS snapshot 305a, and the like, depending on the particular storage entity of the primary FS backup 305a that the user wants to access. In this manner, whatever data portions of 305a are selected, the selected data portions can be copied (405) to the remote copy 405a for use with the techniques of the present disclosure.

The selected portions of the BU data 305a which are copied (405) to the remote copy 405a can be specified in any suitable manner. For example, in at least one embodiment, software running on the data storage system 202, management system 208 and/or BU system or appliance 210 can have a GUI displaying the available backup storage objects, such as 305a, currently on the BU system or appliance 210. Using the GUI, the user can view and select, for example, the desired file(s) of the FS from the BU snapshot 305a, or the entire FS of the BU snapshot 305a to be accessed. Generally, the software can be used to specify the user's selection of the BU data 305a (or portions thereof) to be accessed, and then communicate the selection to the BU appliance 210. Based on the user's selection, selected data can be copied (405) from the BU storage object 305a to the remote copy 405a on the BU system or appliance 210 for subsequent access in connection with the techniques of the present disclosure.

In at least one embodiment as will be described in more detail below, the remote copy 405a can exist and have a lifetime based on a particular session, sometimes referred to as an remote direct access (RDA) session, established to perform processing of the techniques of the present disclosure. With the RDA session in at least one embodiment, the host 301 can be provided with direct access to the remote copy 405a on the BU system or appliance 210 through the data storage system 202. Put another way, rather than require restoration of the remote copy 405a from its backup format to a restored file system instance in the data storage system 202, the host 301 can be provided with access to the remote copy 405a of the back up file system instance on the BU system or appliance 210 using a proxy FS of the data storage system 202 that is mapped to the remote copy 405a. In this manner, the host 301 can access the remote copy 405a directly via the data storage system whereby the data storage system and the proxy FS are used as proxies to access the remote copy 405a stored on the BU system or appliance 210 without restoring the FS instance (e.g., the BU object or instance 305a or the remote copy 405a) on the data storage system 202.

In at least one embodiment, the BU storage object 305a can be in the backup format understood by the BU system or appliance 210 and not be in a restored file system format. The BU format of the BU storage object 305a can be, for example, a proprietary, customized and/or archival format understood and used by the BU system or appliance 210. In at least one embodiment, information about, and content of, the BU storage object 305a can be available when stored in the BU format. Such information and content can include, for example, a listing regarding files in a particular directory as well as content of the files of the remote copy 405a. The particular information and content of the BU storage object 305a available and accessible when stored in its BU format on the BU system 210 can vary with embodiment. As a result, the particular user specified operations, selections and access to particular files within the BU storage object 305a can vary with embodiment. For example, in at least one embodiment where the BU storage object 305a is a BU of a snapshot of the FS, the BU system 210 can be able to provide a user or host access to the entire FS, its directories and/or one or more specified files. As a result, a user can specify a selection, for example, of one or more particular files and/or directories of the BU storage object 305a (e.g., the entire FS) to be accessed. In this case, processing can be performed to: extract from the BU storage object 305a only the selected files and/or directories specified by the user in the selection, create the remote copy 405a which can include only the selected files and/or directories selected by the user, and then provide the user or host with access to the remote copy 405a using the proxy FS of the data storage system in the RDA session in accordance with the techniques of the present disclosure. As a variation, in some embodiments, the BU system 210 may not be able to provide access to particular files and/or directories within the BU storage object 305a whereby the particular items of the backed up FS of the BU storage object 305a which a user can select for inclusion in the remote copy 405a can be limited. Once the RDA session terminates in at least one embodiment, the remote copy 405a can be automatically deleted. The RDA session can terminate, for example, based on a termination request, for example, from a host, such as a user or application executing on the host. Termination of the RDA session can generally be performed responsive to a request to discontinue access to the remote copy 405a. In at least one embodiment, the remote copy 405a can also be in a BU format that is a customized proprietary format in a manner similar to the BU storage object 305a. In such an embodiment, the remote copy 405a can also be a BU object or instance having the same BU format as the BU object 305a as understood and used by the BU system or appliance 210.

The data storage system of the example 400 includes the primary FS 305, LUN 306 and volume 306a, as well as processing flow arrows 302a-c, as discussed in connection with FIG. 4. Additionally, file server 310 of the data storage system 202 includes the proxy FS 405 which is mounted on the LUN 406. The file server 310 can expose to the host 301 the proxy FS 405 which is mounted on a block device, the LUN 406, exposed by the data path 312. Within the data path 312, the LUN 406 can be mapped to an internal volume 406a configured from BE non-volatile storage (e.g., from BE PDs) of the data storage system 202. In at least one embodiment, the volume 406a can denote a local storage object of the system 202 that is not directly exposed outside of the data path 312. The volume 406a can be mapped to the LUN 406, where the LUN 406 denotes a block device exposed by the data path 312 to external clients and services, such as the file server 310.

In at least one embodiment, the sequence of arrows 402a-d denote the logical flow of I/O or other commands and requests from the host 301, for example, when the host 301 issues file-based I/O commands (e.g., read and write commands) or other commands and requests to the proxy FS 405, or a storage entity (e.g., file, folder or directory) of the proxy FS 405. In at least one embodiment, the data storage system 202 can detect that the commands or requests are directed to the proxy FS 405 that is mapped to the remote copy 405a of the BU system 210. Accordingly, the data storage system 202 can redirect (402c) such commands and requests from the LUN 406 to the BU system communication and interface module 316, where the commands and requests are then transmitted (402d) to the BU system 210 for application or use with the remote copy 405a.

Based on the embodiment of FIG. 5, to the host 301, the primary FS 305 and a BU remote copy 405a (denoting a snapshot of the primary FS 305 at a prior point in time) can be visible and accessible to the host 301, respectively, as the mounted primary FS 305 and the proxy FS 405. The proxy FS 405 can be RDA-enabled and used to directly access the remote copy 405a on the BU system 210.

Figure 6:
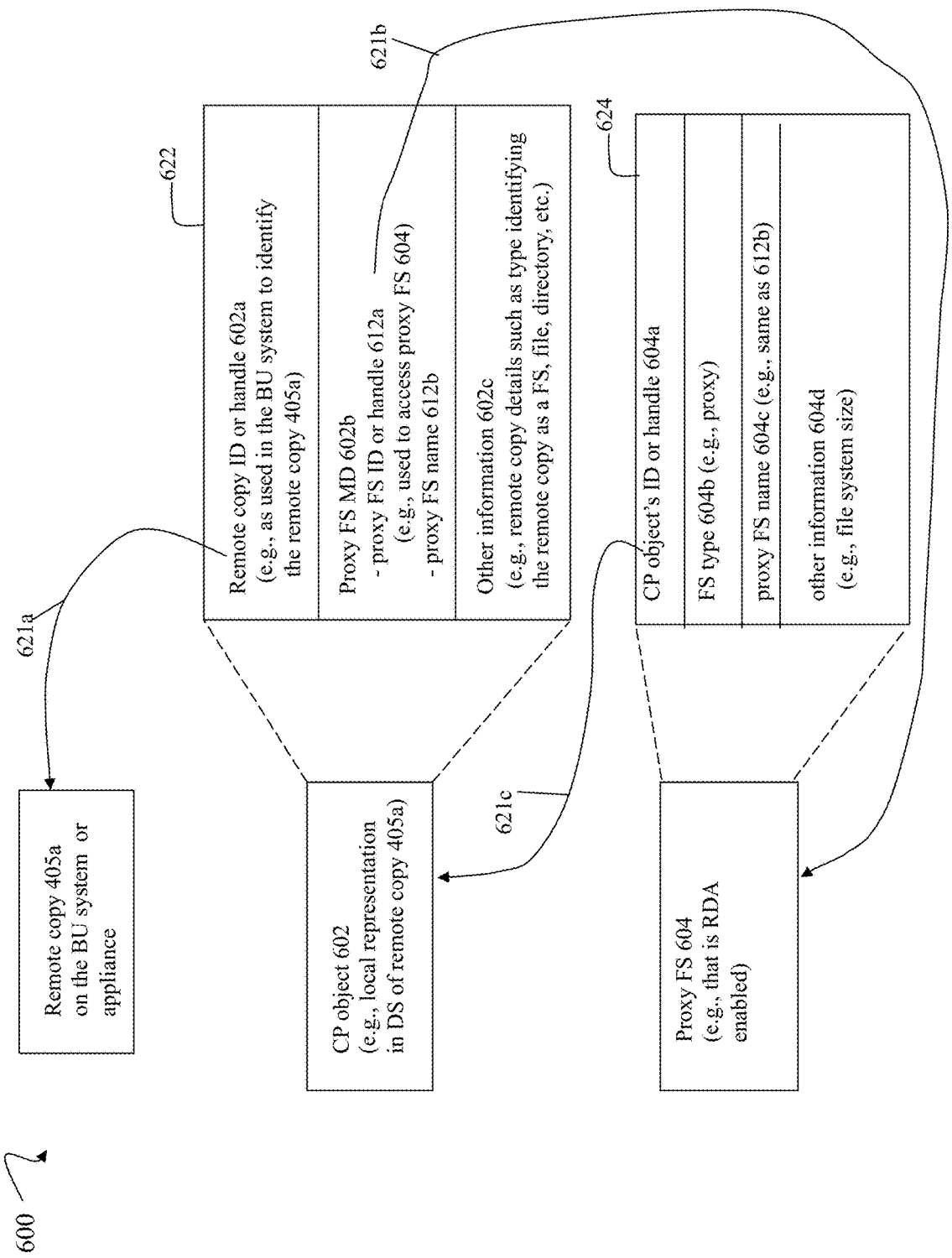
FIG. 6 is an example illustrating structures that can be used in an embodiment in accordance with the techniques of the present disclosure.

Referring to FIG. 6, shown is an example 600 of data structures that can be used in at least one embodiment in accordance with the techniques of the present disclosure.

The example 600 includes the remote copy 405a of the BU object stored on the BU system, the control path (CP) object 602, and the proxy FS 604. Consistent with other discussion herein, the remote copy 405a can be created based on a selected BU object, such as the BU object 305a which is a BU snapshot of the primary FS 305. The CP object 602 and the proxy FS 604 are objects or structures used in the data storage system where the objects or structures 602, 604 are linked or mapped to the remote copy 405a. The CP object 602 can denote the local representation or local object in the data storage system that represents the remote copy 405a. The example 600 illustrates the state of the structures 602 and 604 after the remote copy 405a has been RDA enabled through the proxy FS whereby the proxy FS mapped to the remote copy can be used as a proxy to directly access the remote copy 405a on the BU system or appliance.

The structure 622 illustrates in more detail information that can be included in the CP object 602 in at least one embodiment. The structure 622 indicates that the CP object 602 can include: a handle or ID 602a to the remote copy 405a; proxy FS metadata (MD) 602b; and other information 602c such as, for example, details of the remote copy 405a such as a type identifying the remote copy as a FS, file, directory, etc.). The ID or handle 602a to the remote copy 405a can be an ID or handle used internally by the BU system or appliance in identifying the remote copy 405a. Thus, the ID or handle 602a may have meaning or context when used in the BU system or appliance. The proxy FS MD 602b can include an ID or handle 612a to the proxy FS object 604; and can include the proxy FS name 612b The structure 624 illustrates in more detail information that can be included in the proxy FS object 604 identifying the proxy FS created and used to remotely and directly access the remote copy 405a on the BU system. The structure 624 indicates that the proxy FS object 604 that is RDA enabled can include: a handle or ID 604a to the CP object 602; an FS type 604b indicating that the object 604 describes a proxy FS used for an RDA enabled remote BU object, such as the remote copy 405a; a proxy FS name 604c (e.g., denoting the name of the proxy FS, where the FS name of 604c is the same as that denoted by 612b); and other information 604d such as, for example, the size of the represented file system corresponding to the object 604.

It should be noted that generally the structures 602 and 604 can include other information than as illustrated in the example 600.

The structures 602 and 604 denote the mapping and linkage between the remote copy 405a, the CP object 602 and the proxy FS 604 when the remote copy 405a is RDA enabled so that the proxy FS 604 can be used as a proxy to directly access the remote copy 405a, which is stored on the BU system, from the data storage system. Processing performed to RDA-enable the remote copy 405a for direct access using the proxy FS 604 an include creating and populating the structures 602 and 604 as illustrated, respectively, by the details of the elements 622 and 624.

The field 602a of the CP object details 622 can be used to access 621a the remote copy 405a. The field 602b of the CP object details 622 can be used to access 621b the proxy FS 604. The CP ID or handle 604a can be used to access 621c the CP object 602

An instance of the objects 602 and 604 can be created for each remote copy 405a instance that is enabled for direct remote access (e.g., RDA enabled) in at least one embodiment in accordance with the techniques of the present disclosure.

In this manner, the proxy FS appears to a host as a local FS of the data storage system. Using the linkage and mapping of the structures 602 and 604 (e.g., 622 and 624), a host can use the proxy FS ID or handle that identifies a particular proxy FS instance to access the corresponding proxy FS object 604. The field 604a of 624 of the proxy FS object can be used to access the corresponding CP object 602. The field 602a of 622 of the CP object can be used to access the remote copy 405a. The foregoing mappings or linkages can be used at runtime, for example, when a host issues a command or request, such as a file-based I/O (e.g., read and/or write to a file), or another file system or server-based command (e.g., delete a file or directory; create a new file or directory; list existing files in a directory; and/or list existing directories in a file system), directed to the proxy FS that is mapped to the remote copy 405a using the foregoing mappings and linkages of 602 and 604. The host can, for example, issue a read or write I/O command directed to a particular file of the proxy FS that is mapped to the remote copy 405a. The data storage system receives the I/O command directed to a file of the proxy FS. The data storage system can determine that the I/O command is directed to the file of the proxy FS based at least in part on a file handle for the file included in the I/O command. The data storage system can then map the file handle to the proxy FS including the file. The data storage system can then use the field 604a (of the proxy FS object 604, 624 for the proxy FS) to access the CP object 602, 622, and can use the field 602a of the CP object to access the remote copy 405a on the BU system or appliance. The data storage system can send the I/O command to the BU system or appliance in a request, where the request indicates that the I/O command is applied to the particular file in the remote copy 405a. The request can include the ID or handle 602a of the remote copy 405a as used by the BU system or appliance. In response to the request, the BU system or appliance can apply the I/O command or other more generally any other command or operation that is received from the data storage system and directed to the remote copy 405a. The BU system or appliance can return a response to the data storage system along with any return data that can vary with the command or operation requested. The data storage system can, in turn, return a response along with any return data to the host.

In this manner, at least the foregoing mappings or linkages denoted by 621c and 621a can be used to access the remote copy 405a using the proxy FS and apply the command or request directly to the remote copy 405a as stored on the BU system or appliance.

In at least one embodiment, the proxy FS and the remote copy can be created as described herein, where the proxy FS can be used, such as by a host, to directly access the remote copy on the BU system through the data storage system. In such an embodiment, the host or other client can perform any supported data service or operation on the proxy FS that is used to access and apply the data service or operation directly on the remote copy.

In at least one embodiment, file shares, such as an NFS or CIFS share, can be created in the proxy FS. File shares are known in the art and may denote portions or resources of a file system shared among multiple users. For example, a file share can identify one or more folders or directories of a file system which are shared among multiple users. A host can then mount the file share in order to access the file share, or portions of the file system associated with the file share, that can be further mapped by the proxy FS to the remote copy on the BU system or appliance. The host can issue commands, for example, which are file-based I/O commands directed to a file included in the file share, to view files or other content of the file share, to copy files or read content from files of the remote copy, and the like.

Figure 7:
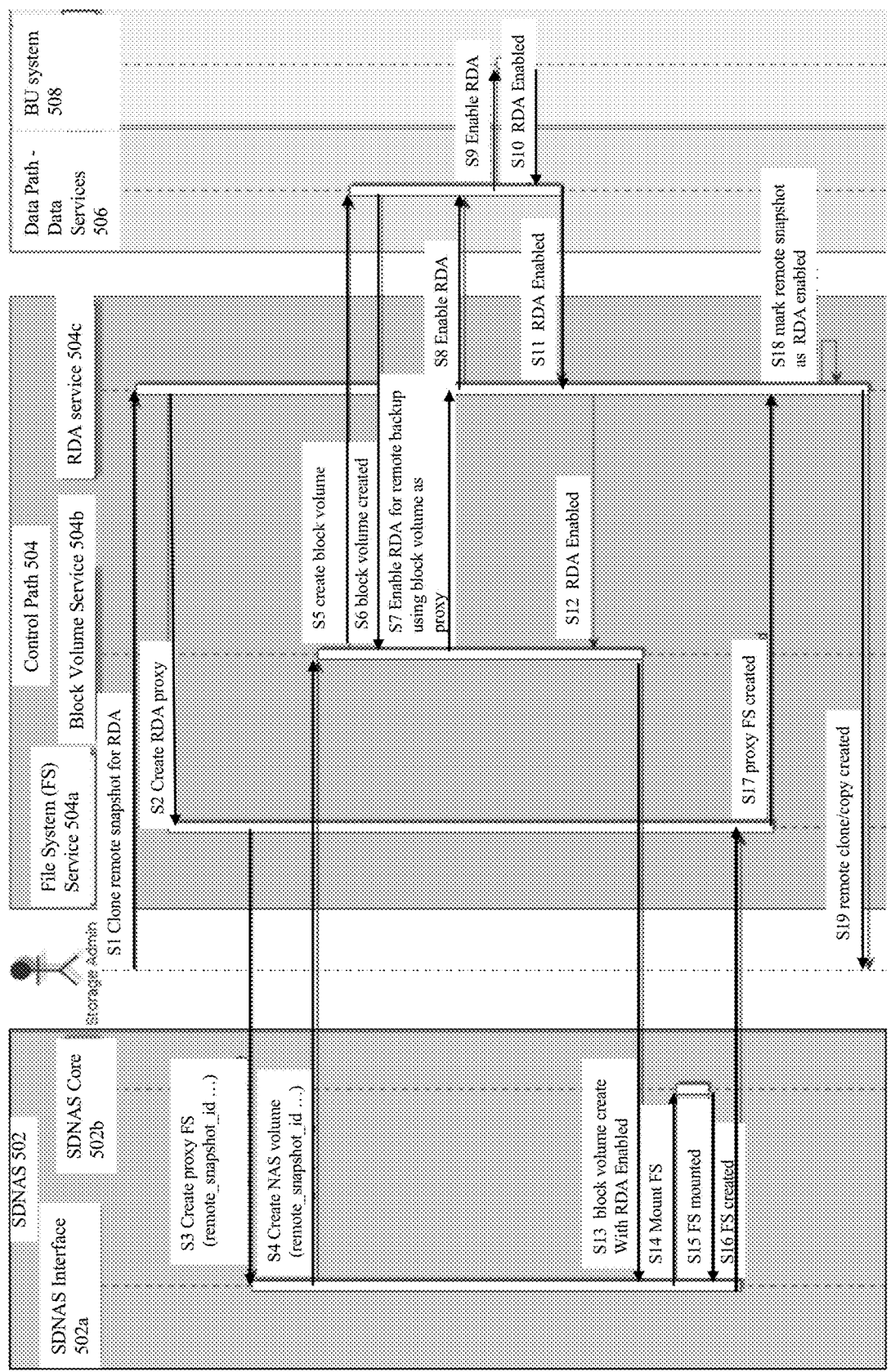
FIG. 7 is an example of a sequence diagram of processing that can be performed in an embodiment in accordance with the techniques of the present disclosure.

Referring to FIG. 7, shown is an example 500 of a sequence diagram illustrating data flow and processing that can be performed between components in at least one embodiment in accordance with the techniques of the present disclosure.

The example 500 includes the following components: an SDNAS component 502 (e.g., denoting an SDNAS or more generally a NAS file server), a control path (CP) component 504, data services 506 of the data path component, a BU system 508. The SDNAS component 502 can include an SDNAS interface component 502a and an SDNAS core component 502b. The SDNAS interface 502a can be used in connection with facilitating communications between the SDNAS component and other non-SDNAS components. The SDNAS core component 502b can generally perform processing to service requests received and perform NAS file and file system operations. The CP 504 can include an FS service 504a, a block volume service 504b and an RDA service 504c. The foregoing components of the example 500 are generally described and illustrated in connection with other figures.

In a step S1, a user, such as a storage administrator, issues a request to the RDA service 504c to create a remote clone or copy of a remote BU snapshot of the primary FS, and enable the remote copy of the selected BU, such as a selected snapshot of an FS, for RDA. The step S1 can include the user viewing and selecting a particular remote BU storage object, such as 305a denoting the remotely stored and backed up snapshot 305a of the primary FS 305, on the BU system or appliance 210. Additionally, in at least one embodiment, the user selection in the step S1 can further include the user viewing and/or refining the selection by, for example, selecting one or more files and/or directories included in the BU snapshot 305a of the primary FS 305a. Based on the user selection(s) in the step S1, subsequent processing includes creating the remote copy of the selected items of a particular BU snapshot, such as 305a, of the primary FS 305. For simplicity of illustration, assume the user selects in the step S1 to access the entire FS as denoted by the BU snapshot 305a, where the remote copy 405a created in subsequent processing is the point in time copy of the primary FS as captured in the BU snapshot 305a.

In at least one embodiment, the remote copy 405a created in subsequent processing (e.g., in connection with the request of the step S9 discussed below) of the BU object 305a on the BU server or appliance 210 can have a corresponding local object within the data storage system 202 to represent the particular remote copy 405a stored on the BU system 210. For example, the remote copy 405a of the BU snapshot 305a can have a corresponding local object used within the data storage system 202 to represent the remote copy 405a. If there are multiple remote copies or instances of BU objects stored remotely on the BU system or appliance 210 for use with the techniques herein, each of the multiple remote copies stored on the BU system 210 can have a corresponding local object used within the data storage system 202 to represent the associated remote copy stored remotely on the BU system 210. Following the step S1 is a step S2.

In response to receiving the request in the step S1, the RDA service issues a request to the FS service 504a in the step S2 to create an RDA proxy. In response to receiving the RDA proxy request of the step S2, the FS service 504a in a step S3 issues a request to the SDNAS interface 502a to create a proxy FS that is mapped to, and can be used to access, the remote copy 405a of the selected snapshot 305a. In the step S3, the remote_snapshot_id denotes the identifier (ID) of a local object used on the data storage system to represent the remote copy 405a of the snapshot 305a.

In at least one embodiment, the remote_snapshot_id can generally denote the ID of a local object that is a CP object used locally in the data storage system, where the CP object represents, and is mapped to, the remote copy 405a of the selected BU snapshot 305a. The CP object can be as described in connection with FIG. 6. The CP object can be used by the data storage system 202 to directly access the remote copy 405a of the BU snapshot 305a as stored on the BU system or appliance. The CP object can be mapped to the remote copy 405a of the snapshot 305a and also to a proxy FS also created in subsequent processing steps. The proxy FS can be enabled for RDA whereby the proxy FS can be used as a proxy to access the remote copy 405a stored on the BU system 210.

Following the step S3 is a step S4. In the step S4, the SDNAS interface 502a can issue a request to the block volume service 504b to create a NAS volume and can pass the remote_snapshot_id as an input parameter to the block volume service 504b.

Following the step S4 is a step S5. In the step S5, the block volume service 504b issues a request to the data services of the data path 506 to create a block volume. Following the step S5, the data services of the data path 506 returns a response in the step S6 to the block volume services 504b that the requested block volume has been created.

Following the step S6 is a step S7. Generally, in the steps S7-S9, processing can be performed to enable RDA to the remote copy 405a using the block volume as a proxy. In the steps S7-S9, processing can include mapping the block volume (created in the step S5) to the remote copy 405a of the BU (created in the step S9) so that the block volume can be used as a proxy for the remote copy 405a and thereby enable RDA to the remote copy using the block volume.

In the step S7, a request can be issued from the block volume services 504b to the RDA service 504c to enable RDA for the remote copy 405a of the BU using the block volume as a proxy. Following the step S7 is a step S8. In the step S8, the RDA service 504c can issue a request to the data services of the data path 506 to enable RDA for the remote copy 405a of the selected BU snapshot 305a. Following the step S8 is a step S9. In the step S9, the RDA service 504c can communicate the request to enable RDA for the remote copy 405a of the selected BU snapshot 305a to the BU system or appliance 508. The requests sent in the steps S8 and S9 can include information identifying the selected remote BU snapshot 305a of the BU system or appliance for which the remote copy 405a is made by the BU system in response to the request received by the BU system or appliance in the step S9. In at least one embodiment, enabling RDA of the remote copy 405a can include creating the remote copy 405a of the selected BU snapshot 305a, and mapping the remote copy 405a to the block volume so that the block volume can be used as a proxy to access the remote copy 405a of the BU snapshot 305a of the primary FS (e.g., where the BU snapshot 305a is stored on the BU system or appliance 210). Following the step S9 is a step S10. At the step S10, a response is returned from the BU system or appliance 508 to the data services of the data path 506 indicating that RDA has been enabled for the remote copy 405a using the block volume as a proxy.

Following the step S10 is a step S11. In the step S11, a response is returned from the data services of the data path 506 to the RDA service 504c indicating the RDA is enabled for the remote copy 405a. Following the step S11 is a step S12. In the step S12, a response is returned from the RDA service 504c to the block volume service 504b indicating that RDA is enabled for the remote copy 405a using the block volume. Following the step S12 is a step S13. In the step S13, a response is returned from the block volume service 504b to the SDNAS interface 502a indicating that the block volume has been created, the remote copy 405a has been created, and the block volume has been mapped to the remote copy 405a with RDA enabled. Following the step S13 is a step S14.

In the step S14, the SDNAS interface 502a issues a request to the SDNAS core services 502b to mount an FS, the proxy FS, on the block volume just created with RDA enabled and mapped to the remote copy 405a. Following the step S14 is a step S15. In the step S15, a response is returned from the SDNAS core services 502b to the SDNAS interface 502a indicating that the proxy FS has been mounted. Following the step S15 is a step S16. In the step S16, a response is returned from the SDNAS interface 502a to the FS service 504a that the requested proxy FS has been created. At this point in at least one embodiment, the proxy FS object has been created and the CP object can include a handle or reference to the remote copy 405a of the BU snapshot 305a on the BU system 210. Additionally, the CP object can be updated to reference the proxy FS. Consistent with other discussion in connection with the example 500, the CP object is the local object having the ID remote_snapshot_id, where the local object is a local representation of the remote copy 405a on the BU system 210. Following the step S16 is a step S17. In the step S17, a response is returned from the FS service to the RDA service that the proxy FS has been created.

Following the step S17 is a step S18. In the step S18, processing can be performed to mark the remote copy 405a and/or the BU snapshot 305a as RDA enabled. The step S18 can include identifying to the user, such as by an updated GUI display of a management application, the name or identifier of the proxy FS that can be used to access the remote copy 405a of the selected BU snapshot 305a of the primary FS 305. From the step S18, control proceeds to a step S19 where the user can be notified that the requested remote copy 405a (e.g., requested in the step S1) of the selected FS snapshot 305a has been created and is available for direct access (e.g., via the data storage system) using the proxy FS.

It should be noted that generally the processing described herein can be performed by other components and services than as described, for example, in FIG. 7 for purposes of illustration.

Figure 8:
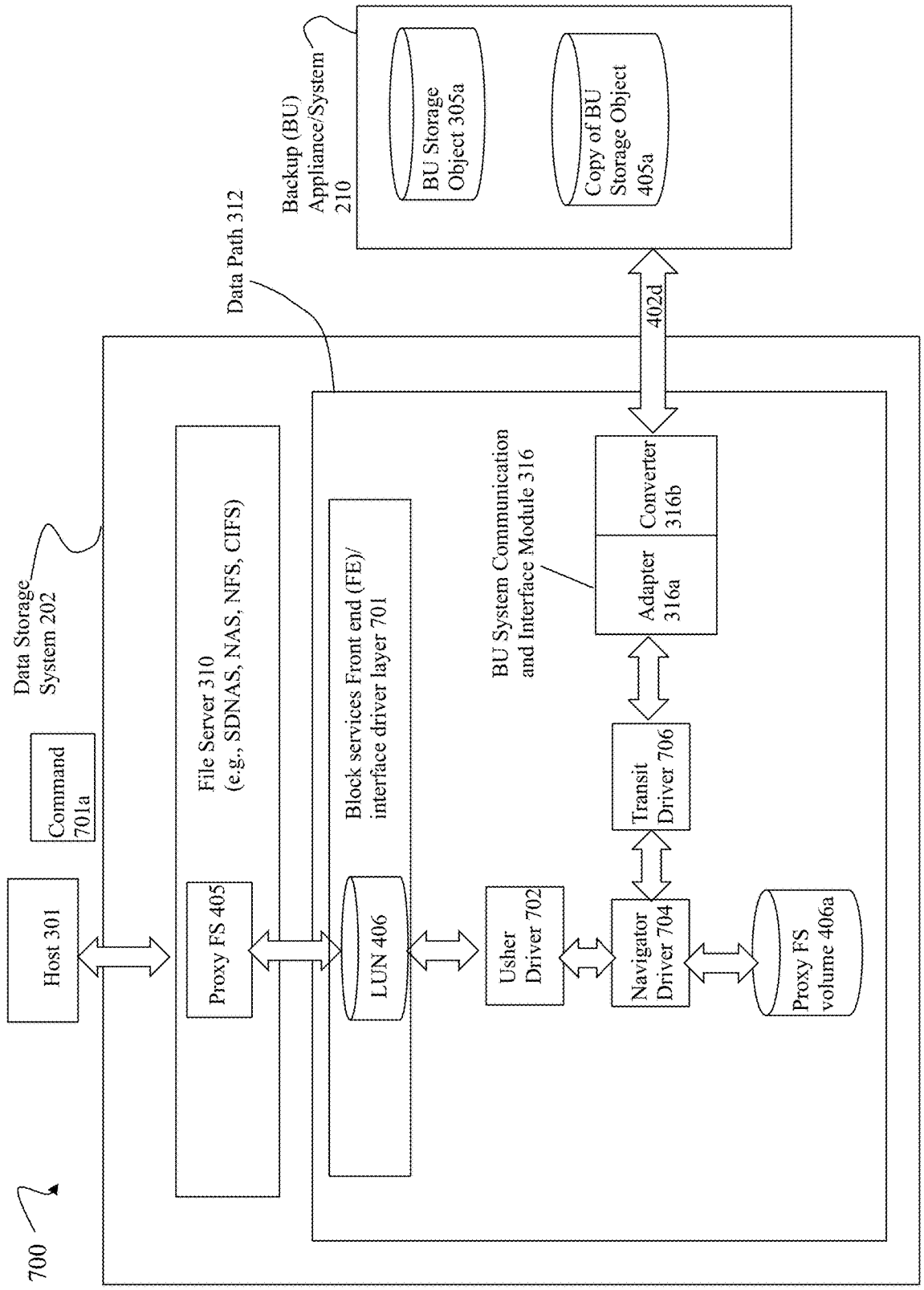

Referring to FIG. 8, shown is an example 700 providing further detail regarding components that can be used in at least one embodiment in accordance with the techniques of the present disclosure.

The example 700 includes components similarly numbered to other described herein such as, for example, in connection with FIG. 5. The FIG. 8 also includes additional detail regarding components of the data path 312 in at least one embodiment.

The example 700 illustrates a runtime stack and data flow between components. The host 301 can issue the command 701a. The command 701a can be, for example, an I/O command directed to file of the proxy FS 405, or a file system-based command, such as a command to delete a file or directory in the proxy FS 405, list the files in a directory of the proxy FS 405, and the like. The command 701a from the host 301 directed to the proxy FS 405 is received by the file server 310 and provided to the block services FE or interface driver layer 701. Generally, the FE or interface layer 701 can translate the file-based command 701a to a block-based command. For example, assume the command 701a is a write I/O command directed to a file F2 in the proxy FS 405. The layer 701 can perform processing including translating the target of the write I/O command from file-based semantics to block-based semantics with a block-based target address. For example, the command 701a that writes to a file offset or logical location L1 in the file F1 can be translated or mapped by the layer 701 into a target address in the form of a LUN and LBA of the LUN. As known in the art, the location L1 in the file F1 can be mapped to a particular LBA of the LUN 406 on which the proxy FS 405 is mounted.

In the example 700, the usher driver 702 can be configured to receive I/O requests and relay them within the data storage system 202. The navigator driver 704 can be configured to direct I/O requests within the data storage system 202 and/or to external systems and devices. For example, the I/O request 701a can be forwarded from the layer 701 to the usher driver 702 and then to the navigator driver 704. The navigator driver 704 can redirect I/O requests, such as 701a, that are associated with the proxy FS to the remote copy 405a (which is mapped to the proxy FS). The transit driver 706 can be configured to transmit and communicate with the BU system communication and interface module 316 so that the I/O command 701a can be executed remotely on the remote copy 405a of the BU system 210. The handle or ID of the remote copy 405a can be provided to the transit driver to enable access to the remote copy 405a. Thus, the combination and use of the drivers 702, 704 and 706 can be used with other components such as 316 to enable the data storage system 202 to provide direct access (from the host 301's perspective) to the remote copy 405a of the BU data or object on the BU system 210.

In at least one embodiment, the structures of FIG. 6 can be used to obtain the handle or ID 602a of the remote copy 405a. Consistent with discussion above in connection with FIG. 6, the proxy FS object 604 for the proxy FS 405 can be accessed to obtain the ID or handle 604a of the CP object 602 which is the local representation of the remote copy 405a. Subsequently, the filed 602a of the CP object 602 can be accessed to obtain the ID or handle of the remote copy 602a. The handle or ID of the remote copy 602a can be passed as an input with the write I/O 701a to the BU system 210 where the write I/O can be applied directly to the remote copy 405a.

In at least one embodiment, the navigator driver 704 can be configured to identify the remote copy 405a based, at least in part, upon information of the I/O request 701a and the ID or handle of the remote copy 405a provided to the navigator driver 704. The information of the I/O request 701a can include, for example, the I/O request 701a's target address which can denote the LUN 406 mounted as the proxy FS 405.

In at least one embodiment such as described in connection with FIGS. 5 and 8, the proxy FS volume 406a can be configured as part of typical or normal processing flow in connection with regular FSs (e.g., those that are not proxy FSs). However, as illustrated in FIGS. 5 and 8, the commands or requests, such as I/O requests, directed to the remote copy 405a mapped to the proxy FS can be redirected by the navigator driver 704 to the remote copy 405a on the BU system 210. In this manner due the foregoing redirection, the proxy FS volume 406a may never actually be accessed or used in connection with servicing the commands or requests generally directed to the proxy FS 405. In at least one embodiment, creation of the proxy FS volume 406a can be omitted. In such an embodiment, the structures as described in connection with FIG. 6 can still be utilized. In such an embodiment, there is no proxy FS volume 406a and thus no LUN 406 upon which the proxy FS 405 is mounted. In such an embodiment with reference to FIG. 5 for example, the elements 406 and 406a are omitted and the proxy FS 405 can be directly connected to the BU system communication and interface module 316. Similarly, the processing described herein, such as the sequence diagram of FIG. 7, can be modified to omit creation of the entities 406 and 406a and also omit processing to mount the proxy FS 405 on the LUN 406. In such an embodiment with reference to FIG. 8, the components 406, 406a and 701 can be omitted from the runtime stack, and the file server 310 exposing the proxy FS 405 and servicing requests and commands directed to the proxy FS 405 can directly communicate with the usher driver 702.

Figure 9:
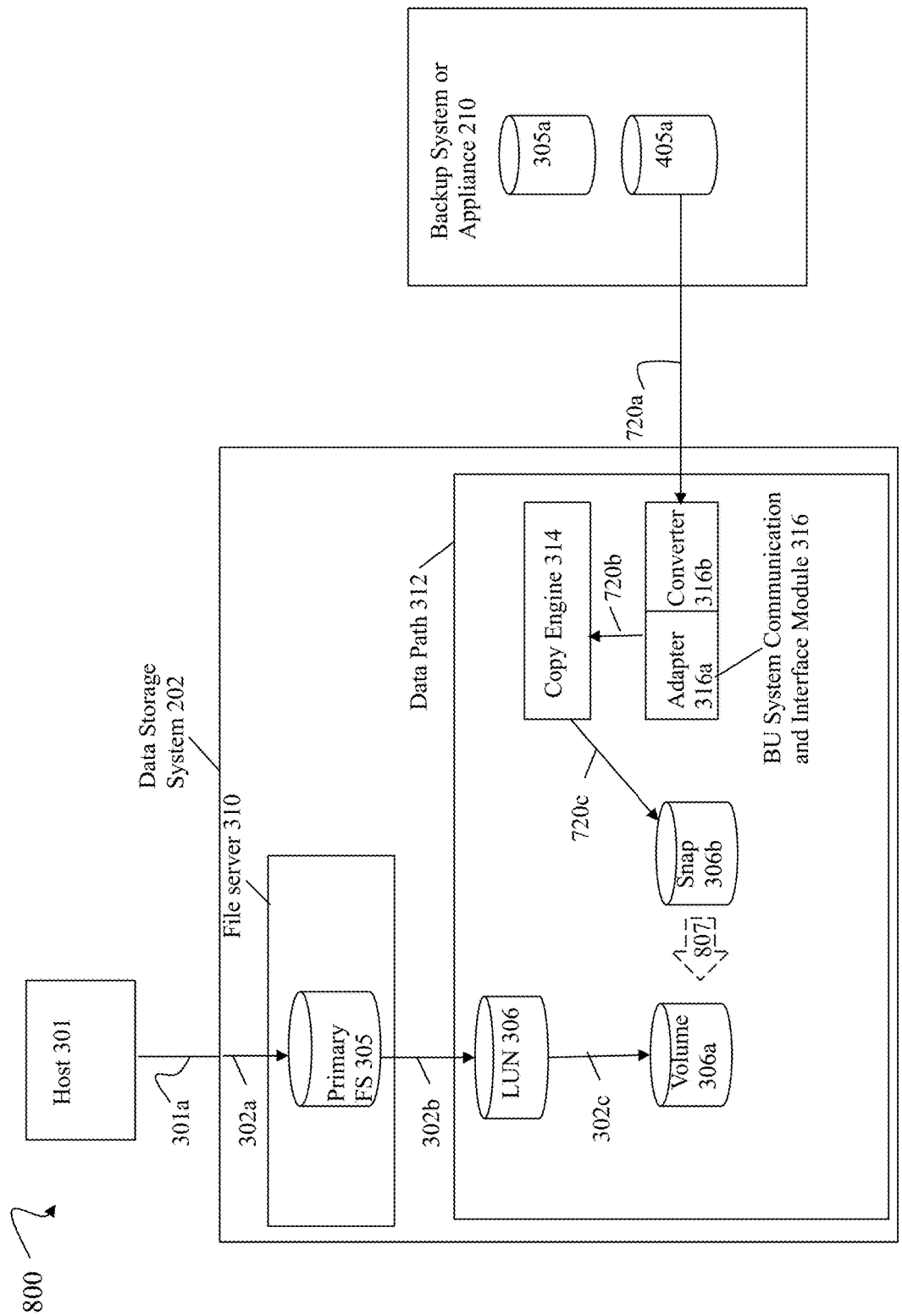

As an example usage scenario with reference to FIG. 9, it may be necessary or desirous to restore a BU object such as 305a, or a remote copy 405a thereof, to the data storage system 202. For example, an application executing on the host 301 may have deleted a file F1 of the primary FS 305. It may be desired to now restore the file F1 to the primary FS 305. The desired copy of F1 can exist as a file in the BU 305a, and can be selected for inclusion in the remote copy 405a. Using the proxy FS 405, a command can be issued to view the files, including F1, in the remote copy 405a of the BU 305a. Subsequently, a command can be issued to restore the file F1 from the remote copy 405a as illustrated in FIG. 9. Generally, the components of FIG. 9 are as described in connection with FIG. 4 with the difference that the processing flow of data is from the remote copy 405a of the BU system 210 to the snap 306b. In particular, the file F1 of the remote copy 405a can be transmitted along the path denoted by the sequence 720a-c to the snap 306b. In this case, the snap 306b of FIG. 9 can denote restoration of the snapshot of the file F1. Sometime after the snapshot of the file F1 is restored as 306b, the snapshot 306b of the file F1 can be further integrated into and restored on the volume 306a and thus restored as a file of the primary FS 305.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
receiving a selection of a backup of a file system, wherein the backup is stored on a backup system connected to a data storage system;
creating, in accordance with said selection of the backup, a remote copy of the backup, wherein the remote copy is stored on the backup system;
generating a proxy file system for the remote copy on the backup system, wherein the proxy file system is mapped by the data storage system to the remote copy on the backup system; and
providing a host with direct access to the remote copy using the proxy file system, wherein the remote copy is identified in the backup system using a backup identifier (ID), and wherein the computer-implemented method further includes:
creating a control path object that is a local representation of the remote copy within the data storage system;
mapping the control path object to the remote copy using the backup ID;
creating a proxy file system object representing the proxy file system in the data storage system; and
mapping the proxy file system object to the control path object.

2. The computer-implemented method of claim 1, wherein the selection includes one or more files in the backup of the file system, and wherein the remote copy includes a corresponding version of each of the one or more files as included in the backup of the file system.

3. The computer-implemented method of claim 1, wherein the selection identifies the file system and wherein the remote copy is a complete copy of the file system at a point in time associated with the backup.

4. The computer-implemented method of claim 1, wherein the backup is a snapshot of the file system at a point in time.

5. The computer-implemented method of claim 1, further comprising:
exposing the proxy file system to the host;
issuing, by the host, one or more I/O operations directed to the proxy file system; and
processing the one or more I/O operations on the remote copy within the backup system.

6. The computer-implemented method of claim 5, further comprising:
receiving the one or more I/O operations at the data storage system; and
redirecting the one or more I/O operations, which are directed to the proxy file system of the data storage system, to the remote copy on the backup system.

7. The computer-implemented method of claim 6, wherein the one or more I/O operations includes at least a first write I/O operation, and wherein said redirecting includes:
sending the one or more I/O operations from the data storage system to the backup system; and
applying, by the backup system, the one or more I/O operations to the remote copy on the backup system.

8. The computer-implemented method of claim 6, wherein the file system of the data storage system is exposed to the host at a same time the proxy file system is exposed to the host, and wherein the method further includes:
issuing a second set of one or more I/O operations directed to the file system; and
applying, by the data storage system, the second set of one or more I/O operations to the file system of the data storage system.

9. The computer-implemented method of claim 1, further comprising:
receiving a request to discontinue access to the remote copy; and
responsive to the request, performing processing including deleting the remote copy on the backup system.

10. The computer-implemented method of claim 1, wherein said providing a host with direct access to the remote copy using the proxy file system includes: using the proxy file system object and the control path object to retrieve the backup ID of the remote copy; and accessing the remote copy on the backup system using the backup ID of the remote copy on the backup system.

11. The computer-implemented method of claim 10, wherein said accessing the remote copy includes providing the backup ID to the backup system to identify the remote copy on the backup system to be accessed.

12. A system comprising:
one or more processors; and
a memory comprising code stored therein that, when executed, performs a method comprising:
receiving a selection of a backup of a file system, wherein the backup is stored on a backup system connected to a data storage system;
creating, in accordance with said selection of the backup, a remote copy of the backup, wherein the remote copy is stored on the backup system;
generating a proxy file system for the remote copy on the backup system, wherein the proxy file system is mapped by the data storage system to the remote copy on the backup system; and
providing a host with direct access to the remote copy using the proxy file system, wherein the remote copy is identified in the backup system using a backup identifier (ID), and wherein the method further includes:
creating a control path object that is a local representation of the remote copy within the data storage system;
mapping the control path object to the remote copy using the backup ID;
creating a proxy file system object representing the proxy file system in the data storage system; and
mapping the proxy file system object to the control path object.

13. A non-transitory computer readable medium comprising code stored thereon that, when executed, performs a method comprising:
receiving a selection of a backup of a file system, wherein the backup is stored on a backup system connected to a data storage system;
creating, in accordance with said selection of the backup, a remote copy of the backup, wherein the remote copy is stored on the backup system;
generating a proxy file system for the remote copy on the backup system, wherein the proxy file system is mapped by the data storage system to the remote copy on the backup system; and
providing a host with direct access to the remote copy using the proxy file system, wherein the remote copy is identified in the backup system using a backup identifier (ID), and wherein the method further includes:
creating a control path object that is a local representation of the remote copy within the data storage system;
mapping the control path object to the remote copy using the backup ID;
creating a proxy file system object representing the proxy file system in the data storage system; and
mapping the proxy file system object to the control path object.

14. The non-transitory computer readable medium of claim 13, wherein the selection includes one or more files in the backup of the file system, and wherein the remote copy includes a corresponding version of each of the one or more files as included in the backup of the file system.

15. The non-transitory computer readable medium of claim 13, wherein the selection identifies the file system and wherein the remote copy is a complete copy of the file system at a point in time associated with the backup.

16. The non-transitory computer readable medium of claim 13, wherein the backup is a snapshot of the file system at a point in time.

17. The non-transitory computer readable medium of claim 13, further comprising:
exposing the proxy file system to the host;
issuing, by the host, one or more I/O operations directed to the proxy file system; and
processing the one or more I/O operations on the remote copy within the backup system.

18. The non-transitory computer readable medium of claim 17, further comprising:
receiving the one or more I/O operations at the data storage system; and
redirecting the one or more I/O operations, which are directed to the proxy file system of the data storage system, to the remote copy on the backup system.

19. The non-transitory computer readable medium of claim 18, wherein the one or more I/O operations includes at least a first write I/O operation, and wherein said redirecting includes:
sending the one or more I/O operations from the data storage system to the backup system; and
applying, by the backup system, the one or more I/O operations to the remote copy on the backup system.

\* \* \* \* \*